United States Patent [19]

Collins

[11] 4,303,504
[45] Dec. 1, 1981

[54] MAGNETIC FILTRATION
[75] Inventor: Gerald Collins, Thurso, Scotland
[73] Assignee: United Kingdom Atomic Energy Authority, London, England
[21] Appl. No.: 180,931
[22] Filed: Aug. 25, 1980
[30] Foreign Application Priority Data
  Sep. 7, 1979 [GB] United Kingdom ............... 31066/79
[51] Int. Cl.³ ................................................ B03C 1/02
[52] U.S. Cl. ................................ 209/223 R; 209/232; 210/222
[58] Field of Search .................... 209/214, 223 R, 224, 209/232; 210/222, 223; 55/100

[56] References Cited
U.S. PATENT DOCUMENTS
2,331,769 10/1943 Frantz ................................. 209/224
3,343,676 9/1967 Tyrrell ............................ 210/223 X
3,850,811 11/1974 Wheelock .......................... 210/223

FOREIGN PATENT DOCUMENTS
1090567 10/1960 Fed. Rep. of Germany ... 209/223 R
676487 7/1952 United Kingdom ................ 209/224

Primary Examiner—Ralph J. Hill
Attorney, Agent, or Firm—William R. Hinds

[57] ABSTRACT

A magnetic filter in which an elongate ferromagnetic filter member is disposed within a housing having an inlet for fluid to be filtered and an outlet for filtrate with magnet means outside the housing for creating a magnetic field across the filter member. The member conveniently is in the form of an array of spaced apart bars of rectangular cross-section, the magnetic field being directed normal to the longitudinal axes of the bars and substantially parallel to the longer cross-sectional side of each bar.

4 Claims, 2 Drawing Figures

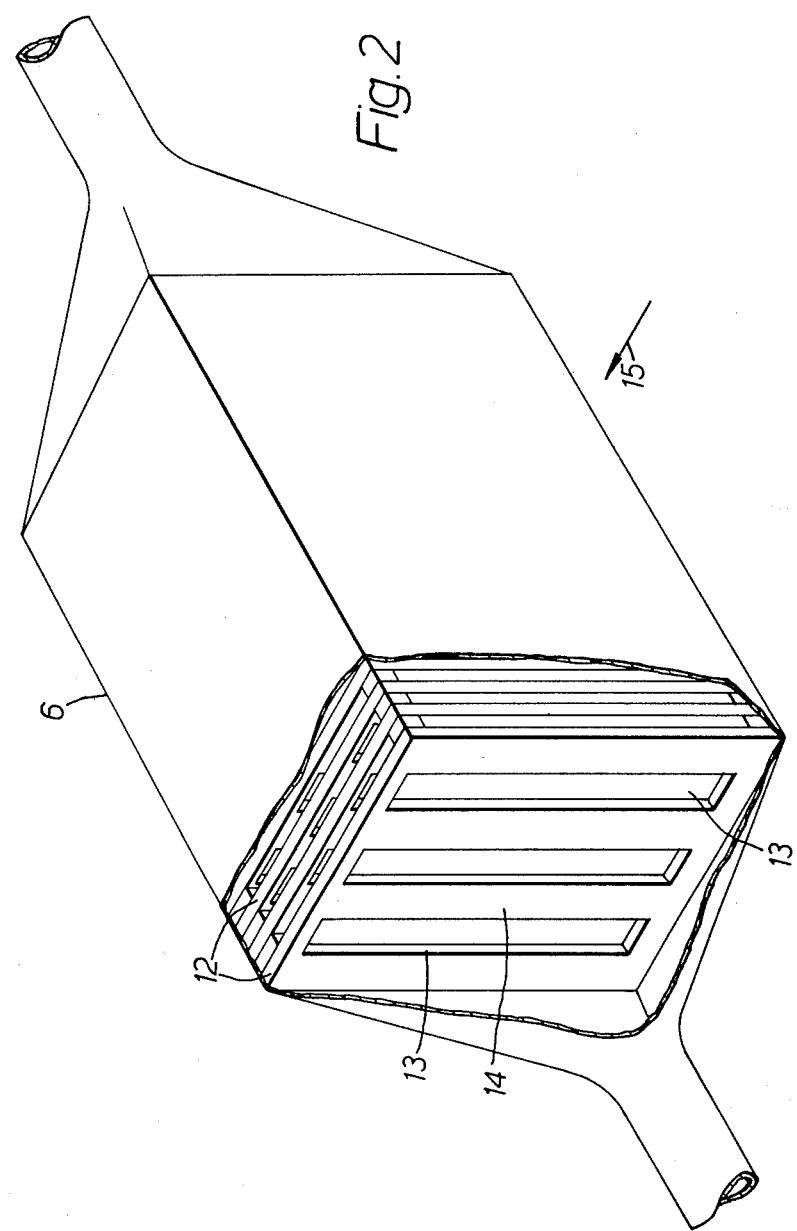

MAGNETIC FILTRATION

The present invention concerns magnetic filtration.

In a conventional filter, particles are precipitated on to the fibres of the filter either by diffusion, inertia or direct impaction. The particles remain attached to the fibres as a result of van der Waals forces or other surface electrostatic forces.

BACKGROUND OF THE INVENTION

It is known that for magnetic or paramagnetic particles the rate of precipitation and the adhesion of the particles to the fibres of the filter can be increased by a so-called high gradient magnetic filter. In such a filter a matrix of ferromagnetic fibres are located in a strong magnetic field. High magnetic gradients adjacent the fibres magnetically attract the particles to the fibres with a force greater than that due to diffusion or inertia. Further, the magnetic force holding the particles to the fibres is considerably greater than the normal van der Waals forces.

As an example, a high gradient magnetic filter can comprise a ferromagnetic wire wool matrix which is contained in a stainless steel can, the can being located between the poles of a magnet. The filter can be cleaned by removing the magnetic field and flushing with a liquid to remove captured particles.

It is found in practice that with a wire wool matrix a large quantity of liquid is required to clean the matrix. In addition, the wire matrix filler has a small volume filling or packing factor, defined as the ratio of the volume of the wire wool to the total volume of the can, and as a result the quantity of particles the filter can hold is limited. Also, as the efficiency of the filter decreases as soon as particles are captured thereon, it suffers the disadvantage that it must be cleaned at relatively frequent intervals. This is particularly relevant when the wire matrix is used to filter a continuous flow therethrough.

Accordingly, the present invention seeks to provide an improved form of magnetic filtration which does not rely on the above mentioned wire wool matrix filter.

SUMMARY OF THE INVENTION

According to the present invention a magnetic filter comprises a housing having an inlet for a fluid to be filtered and an outlet for filtrate, an elongate ferromagnetic filter member within the housing and magnet means for creating a magnetic field across the ferromagnetic filter member.

Preferably, the filter member comprises a plurality of bars of rectangular cross-section. A plurality of relatively short bars can be arrange in end-to-end abutting relationship to form a continuous filter of a required length.

Preferably, the bars are arranged in an array of staggered rows and columns.

DESCRIPTION OF THE DRAWINGS

The invention will be described further, by way of example, with reference to the accompanying drawings in which:

FIG. 2 is a perspective cut-away view of a detail.

DESCRIPTION OF THE PREFERRED EMBODIMENT

Figure 1:
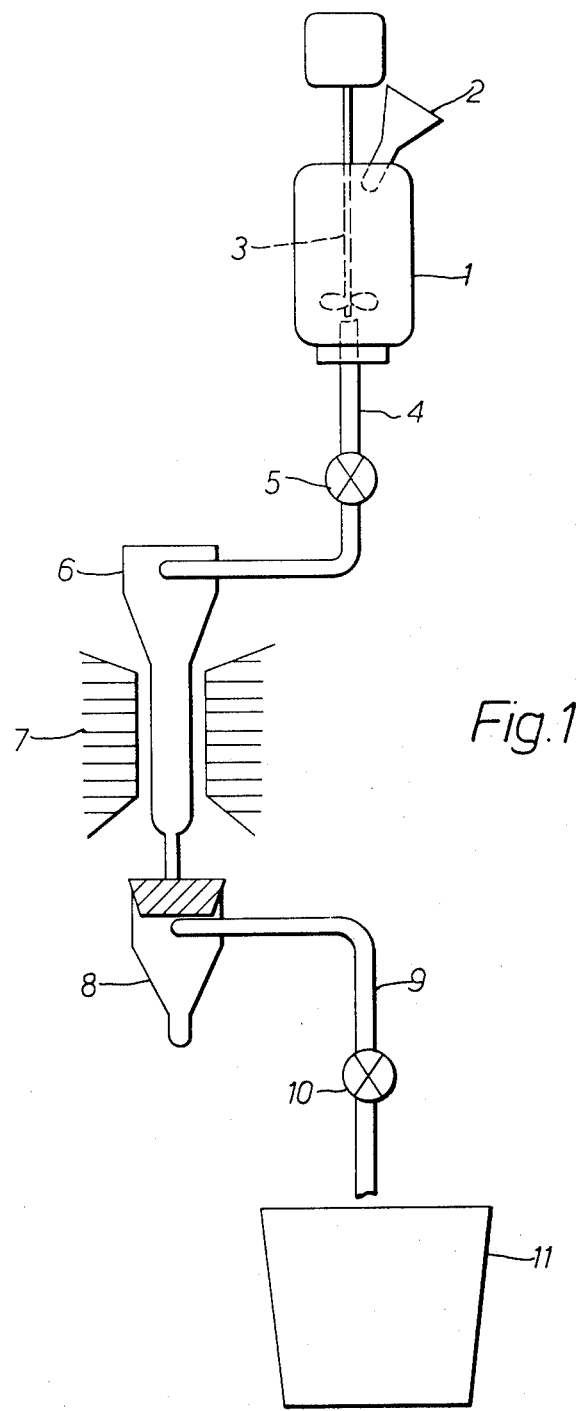
FIG. 1 is a diagrammatic representation of an apparatus operable in a continuous mode.

With reference to FIG. 1, an apparatus operable in a continuous mode comprises a reservoir 1 which can be supplied with a liquid to be filtered through a funnel 2. A stirrer 3 extends into the reservoir. A duct 4, controlled by an on/off valve 5, supplies the liquid to the inlet of a vessel 6 which is located between the poles of a magnet 7, conveniently an electromagnet. An outlet from the vessel 6 leads to a trap 8 and a bleed tube 9 having an on/off valve 10 leads from the trap to a container 11 for filtered liquid.

The vessel 6, which can be of glass, plastics or other non-magnetic material, contains an elongate ferromagnetic filter. The filter can comprise a single member or a plurality of ferromagnetic members in a spaced array. Preferably, the member or each elongate member is of rectangular cross-section and is arranged within the vessel with its longitudinal axis normal to the direction of flow of liquid to be filtered through the vessel. The filter can be formed from a high carbon silver steel. A plurality of ferromagnetic members can be arranged in a cluster within the vessel 6. Thus, for example, a central member can be surrounded by a number of similar members at a substantially uniform spacing. However, it was observed experimentally that the members arranged about the central member act as a magnetic shield and that the central member collected only a fraction of the precipitate collected by any one of the surrounding members.

A preferred form of filter is shown in FIG. 2. The filter comprises a plurality of ferromagnetic plates 12 in spaced, stacked array. Each plate 12 is formed with rectangular slots 13 providing adjacent rectangular rods or bars 14. The slots 13 and the bars 14 are offset or staggered between adjacent plates so as to provide tortuous passageways for liquid passing through the vessel 6 from the inlet to the outlet. The liquid flow path is substantially normal to the longitudinal axes of the bars 14. The magnetic field created across the poles of the magnet 7 is denoted in FIG. 2 by the arrow 15. The magnetic field is substantially normal to the longitudinal axes of the rods and to the liquid flow and in any plane normal to the longitudinal axis of each bar the longer side (a) is aligned substantially parallel to he magnetic field. The plates 12 can be high carbon steel, silver steel annealed members.

Tests were conducted to establish the effect, if any, of differences in spacing between the bars. It was determined that the rate of collection of precipitate is independent of bar spacing with the implication that the volume filling factor, as hereinbefore defined, can be increased substantially compared to that possible with a wire wool or mesh filter. The following Table 1 lists a range of rectangular filter members, each of substantilly the same cross-sectional area but differing aspect ratios. Aspect ratio is the ratio of the length of the longer side (a) to that of the shorter side (b) at any cross-section along the length of the member.

TABLE 1

| | Rectangular Filter Elements | | | |
|---|---|---|---|---|
| No | a mm | b mm | Aspect Ratio a/b | X-Section Area mm$^2$ |
| 1 | 2.85 | 2.83 | 1.01 | 8.09 |
| 2 | 3.90 | 2.03 | 1.92 | 7.92 |
| 3 | 5.00 | 1.62 | 3.09 | 8.10 |
| 4 | 6.03 | 1.35 | 4.47 | 8.14 |

TABLE 1-continued

| | Rectangular Filter Elements | | | |
|---|---|---|---|---|
| No | a mm | b mm | Aspect Ratio a/b | X-Section Area mm² |
| 5 | 7.07 | 1.08 | 6.55 | 7.64 |
| 6 | 8.05 | 1.06 | 7.59 | 8.53 |
| 7 | 9.00 | 0.93 | 9.68 | 8.37 |

With the longer side (a) parallel to the magnetic field the rate of collection relative to a control was measured. It was established that an improvement in collection efficiency, in the region of 75%, can be obtained with an aspect ratio of 4:1. The magnetic gradient increases as the aspect ratio is increased but the volume over which this gradient is effective and the area available for particle collection both decrease with elements of a substantially constant cross-sectional area. An optimum value of 4:1 is the combined effect of these three factors.

Table 2 below gives design parameters for an example of a magnetic filter according to the invention.

Table 2

(a) Dimension of filter
Length 1 meter Cross-Sectional Area=40 mm×340 mm
(b) Filter Matrix
4000 rectangular cross-section individual elements, each 2.0 mm×0.5 mm. Packing factor 30%
(c) Magnetic Field Strength
1 Tesla
(d) Flow Rate
0.34 m³/hour (total treatment time 3.7 hours)
(e) Efficiency
97%

The filter can comprise an array of 4000 rectangular bars. The array can be manufactured by chemically milling slots in metal plates and sandwiching the plates together with separating spacers as shown in FIG. 2. Such a filter array is easy to clean by back-flushing to remove precipitate on removal of the magnetic field. Further the packing factor of the order of 30% is some ten times greater than that obtainable with a wire mesh filter resulting in the filter being able to accommodate approximately ten times more solids before efficiency decreases.

I claim

1. A magnetic filter comprising a housing, inlet means to the housing for a liquid to be filtered, outlet means from the housing for filtrate, a ferromagnetic filter member in the form of an array of spaced apart substantially parallel bars of rectangular cross-section located within the housing between the inlet and outlet means with the longitudinal axes and the longer of the transverse axes of the bars being substantially normal to liquid flow through the housing, and magnet means outside the housing for creating a magnetic field across the filter member, the magnetic field being directed substantially normal to the longitudinal axes of the bars and substantially parallel to the longer cross-sectional side of each rectangular bar.

2. A magnetic filter according to claim 1 in which the filter member comprises an array of spaced apart ferromagnetic plates, each plate having slots therein to define the bars.

3. A magnetic filter according to claim 2 in which the slots and bars in adjacent plates of the array are staggered to provide a tortuous flow path through the array.

4. A magnetic filter according to claim 1 in which the ratio of the length of the transverse longer side to that of the transverse shorter side of each bar is 4 to 1.

* * * * *